United States Patent [19]
McVay

[11] 3,784,005
[45] Jan. 8, 1974

[54] ADDITIVE PACKAGE AND METHOD OF COMPOUNDING RESINS THEREWITH

[75] Inventor: Malcolm Scott C. McVay, Aurora, Ohio

[73] Assignee: U.S. Chemicals and Plastics, Inc., a division of Alco Standard Corporation, Canton, Ohio

[22] Filed: Dec. 20, 1971

[21] Appl. No.: 210,018

Related U.S. Application Data

[63] Continuation-in-part of Ser. No. 10,316, Feb. 10, 1970, abandoned.

[52] U.S. Cl................. 206/84, 206/47 A, 260/862, 260/40 R
[51] Int. Cl............................................. B65d 81/32
[58] Field of Search........................... 206/84, 47 A; 260/40 R, 862

[56] References Cited
UNITED STATES PATENTS

| | | | |
|---|---|---|---|
| 2,757,160 | 7/1956 | Anderson | 260/40 R |
| 2,791,327 | 5/1957 | Sparks et al. | 206/84 |
| 2,806,595 | 9/1957 | Spake | 206/84 |
| 3,186,869 | 6/1965 | Friedman | 206/84 |

FOREIGN PATENTS OR APPLICATIONS
955,079  4/1964  Great Britain................... 206/47 A

*Primary Examiner*—William T. Dixson, Jr.
*Attorney*—James H. Tilberry et al.

[57] ABSTRACT

A package to contain materials to be added to a resin formulation containing vinylic monomer comprises a thin-walled plastic envelope which is soluble in the resin formulation. Preferably the envelope is made of polystyrene film. The polystyrene envelope is formed from sheet stock over a hot mandrel by sliding a rigid container onto the mandrel over a sheet of flexible plastic film overlying the mandrel. The sheet of film is large enough to form a lining for the rigid container with flaps of the film protruding from the rigid container. After materials are placed inside the lined rigid container, the flaps are sealed to form an enclosed film package within the rigid container. Additive materials which would themselves dissolve or attack the plastic envelope may be carried in an inert vehicle and/or be coated with an inert coating material to protect the envelope during storage.

12 Claims, 8 Drawing Figures

PATENTED JAN 8 1974
3,784,005
SHEET 1 OF 2
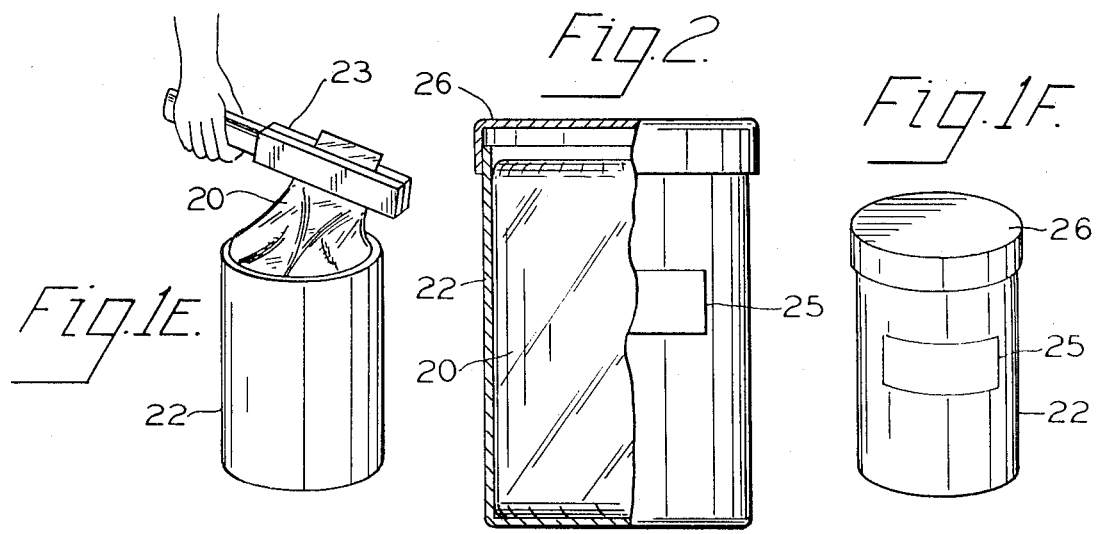
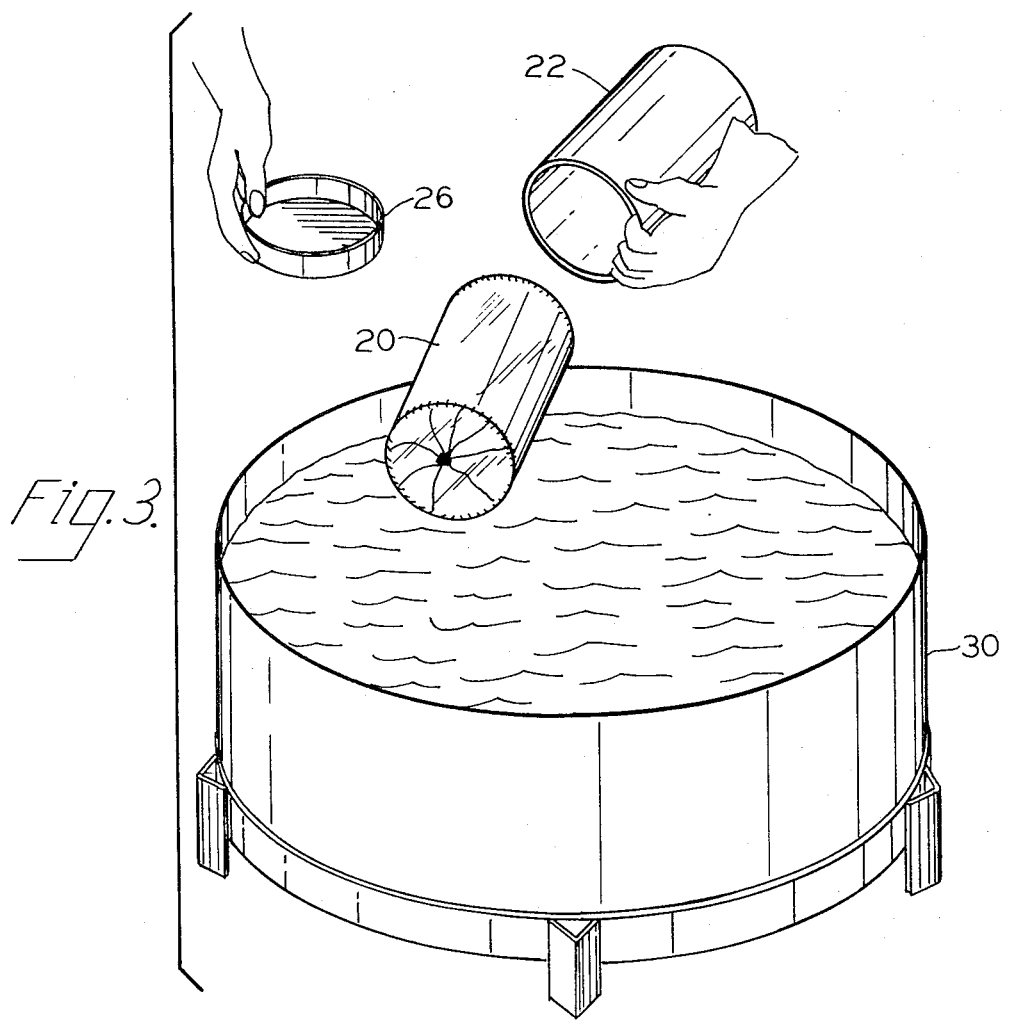

ADDITIVE PACKAGE AND METHOD OF COMPOUNDING RESINS THEREWITH

DISCLOSURE

This application is a continuation-in-part application to my copending application Ser. No. 10,316, filed Feb. 10, 1970, now abandoned.

This invention relates to the resin compounding art and more particularly to a package for holding ingredients (additives) to be added to a resin formulation, and to a method of making such packages and compounding resins therewith.

The invention is particularly applicable to compounding polyester resins and most particularly, unsaturated polyester resins, where styrene or some other vinylic monomer is present for cross linking purposes. However, it will be appreciated that the invention is equally applicable to the compounding of any other resins which contain a vinylic monomer, and to the compounding of resin formulations which contain a component in which the material from which the package envelope (as described hereinbelow) is made, is soluble.

The term "additive" as used in this specification and claims, is intended to embrace any material which is added to a resin formulation, eg, materials which are added to the resin formulation to modify its physical and/or chemical properties, or to facilitate the molding or curing of the resin. Without limiting the generality of the term, exemplary additives include catalysts, colorants, ultraviolet stabilizers, fillers, reinforcements, thixotropic agencts, mold release agents, fire retardants, waxes to prevent air inhabition, and silanes to improve adhesion of the resin to glass.

The terms "vinylic" or "vinyl" as used in this specification and claims have their usual, accepted meaning, i.e., to designate a molecule characterized by containing the general structure

. The term "vinyl(ic) monomer" means a monomer or other polymer precursor which has the characteristic vinylic structure.

The term "copolymer" as used in this specification and claims has its usual meaning as being a polymeric material which combines two or more different monomers in the polymeric molecular structure.

Heretofore, compounding of resins has been accomplished by maintaining bulk quantities of the additives on hand, measuring out the desired quantity of additive from a bulk reservoir, and then blending the measured amount of additive with the polyester resin.

This procedure suffers from a number of disadvantages. It requires the resin compounder to maintain on his premises bulk quantities of a variety of additives. The potential for error in measurement exists everytime a portion must be taken from the bulk additive and introduced into the formulation. Additives with short shelf lives may deteriorate before they can be sed. The spillage of additives which may occur during measurement and transfer of the additive to the resin is not only wasteful and costly, but may result in inaccurate quantities of additives being introduced and consequent failure to meet specifications.

Many of the foregoing problems can be coped with by the use of semi-automatic or fully-automatic measuring equipment, although this is an expensive solution to the problem. There are, however, further problems that even semi-automatic or automatic measuring equipment will not solve. One such problem arises where an additive consists of a suspension of particles in a liquid vehicle, as is the case with catalysts for polyester resins, such as benzoyl peroxide. The particles of peroxide tend to settle out on standing. Consequently, when a measured amount of suspension is removed from a bulk container, the actual concentration of peroxide will vary depending on the amount of settling which has taken place, and whether the measured amount is taken from the top or the bottom of the bulk container. In any event, this procedure makes it exceedingly difficult to maintain a close control over the amount of peroxide catalyst which is added to a given batch of polyester resin.

Another problem not coped with by automated measuring equipment is the handling of hygroscopic additives. These may include CaO, Ca(OH)$_2$, MgO and Mg(OH)$_2$ which are useful as viscosity control agents. Moisture picked up by these materials not only interferes with accurate weighings but also causes caking which makes it difficult to uniformly distribute the materials throughout the resin.

One approach for solving the foregoing problems is to pre-package the additive in a sealed container which is soluble in the resin formulation. Such a scheme is shown, for example, in British Pat. No. 955,079 published Apr. 15, 1964. This patent discloses the use of a sealed container made at least in part of polystyrene, which contains a catalyst material. The polystyrene is of such a thickness that when placed into a styrene containing resin formulation, at least the polystyrene portion of the package can dissolve in the styrene and/or can be attacked by the catalyst composition itself so that the catalyst material is liberated from the package into the formulation. There are some obvious shortcomings to this scheme. If the polystyrene container is attacked by the additive it contains, i.e., the peroxide catalyst, its shelf life will obviously be very limited. The patentee of the British Patent attempts to overcome this problem by providing a composite container wherein only the upper portion is made of styrene and the lower portion is made of an inert material or a material impervious to attack by the catalyst. In this manner, when the container is up-ended into the resin formulation, the polystyrene portion is dissolved. The patentee states that is is a simple matter to remove the remaining portion of the container from the formulation. However, it is obviously highly disadvantageous to have insoluble remnants of the package immersed in the resin formulation. The formulation may have to be stirred or mixed, and it will be difficult and time consuming to remove the remnants, particularly if the remnant portions have been broken up into numerous pieces. Further, the introduction of insoluble, extraneous material into resin formulation is often unacceptable, since resins must often be compounded to exceedingly strict specifications if they are to fulfill successfully their intended function.

Another obvious shortcoming of the composite package approach of the British Patent is that if the package is jostled during shipment or storage, the catalyst or other material contained therein will contact the polystyrene portion and will commence to dissolve it.

When the additive material is one which does not attack polystyrene, the Manly British patent teaches the use of an all-polystyrene package. However, in order to have a package of sufficient strength to be filled, sealed, handled and placed in storage, the wall thickness of polystyrene required is such that the package would dissolve only slowly, particularly in formulations which contain only a small portion of vinyl monomer or other substance in which the polystyrene is soluble. For example, in the Manly British patent referred to above, a polystyrene package of 0.3 mm wall thickness is sealed onto the container by an adhesive or by heat-sealing. In some formulations containing only small proportions of vinyl monomer, such thick wall sections of a polystyrene package might not dissolve at all, resulting in a problem similar to that which occurs when a composite package is used. That is to say, even with an all polysytrene package, thick sections such as those found in the end-sealing caps would remain undissolved. Further, the sealing with adhesive or by heat-sealing is obviously a painstaking and time-consuming manufacturing operation.

For example, one previous procedure tried by applicant had been to employ circular lids of five to 6 mils thick polystyrene and to form a cylinder from 1½ mils thick polystyrene by gluing the seam with a polystyrene adhesive. The cylinder thus formed was glued to one circular lid to form a container open at one end, which was then filled with the additive, and a second closing lid was then glued on the top end of the container to seal it. This procedure was found to be time-consuming and laborious. Also, the thick lid portions were difficult to dissolve in the resin formulation, and the thin center portion lacked sufficient mechanical strength to withstand handling in storage and use.

The foregoing discussion is in no way intended to deprecate the teaching of the Manly patent, but merely to point out the prior art problems which the present invention is intended to overcome.

Another possible approach to the problem of prepackaged additives would be to form a rigid all-polystyrene container from a foamed polystyrene material which, because of its low density, would contain less material per unit wall thickness as compared to sheet polystyrene. Theoretically, such material would dissolve more readily than an equivalent thickenss of non-foam stock. However, even the relativey large surface area of polystyrene foam material does not permit it to dissolve quickly enough, particularly in resin mixtures where the component in which the foam material is soluble is present in but limited amounts. The result is that undissolved pieces of the foam material remain in the resin formulation. Thus, foam material suffers from the same disadvantage as thick-wall plastic sheets.

It is accordingly an object of the present invention to provide an additive package which overcomes the foregoing problems and provides an air-tight soluble package of unlimited shelf life, which is simple and easy to manufacture and which will completely dissolve in a short time even in resin formulatins containing only a small proportion of components in which the plastic film is soluble.

In seeking to overcome the problem of solubility, it was found that by making an additive envelope of a sufficiently thin film of synthetic organic material, i.e., a thin plastic film, the envelope would readily dissolve in the formulation, even if the formulation contained only a minor amount of component in which the film was soluble. Generally, it was found that a film of not more than about two mils thickness is satisfactory insofar as solubility is concerned.

Although the thin film envelope of the invention overcomes the problem of rapid and complete solution of the envelope in the resin formulation, certain problems were engendered by the thin-film construction. For one, difficulty was experienced in forming, filling and sealing the package without rupturing it. For another, even if the package were successfully filled and sealed, the handling it sustained in storage and shipment prior to use, would cause excessive losses due to rupture of the film. These problems are overcome in accordance with the invention by filling and forming the envelope in its own rigid shipping and storage container, from which it is removed only at the point of use.

In accordance with the present invention, there is provided an additive package comprising an envelope made of a thin film of synthetic organic polymeric material which is soluble in at least one component of the resin formulation into which the additive is to be introduced, the thin film envelope being formed in and supported by a rigid shipping and storage container.

The invention is applicable to any resin formulation which contains one or more components in which the thin film of organic polymeric material will dissolve, i.e., one or more "solvent components." The term "solvent component" is used in some of the claims to mean the component of the formulation which will dissolve the film. For example, film materials such as polystyrene will dissolve in aromatic compounds (unsaturated cyclic compounds), in naphthenic oils and solvents (cycloparaffins) and in esters. Polystyrene and other polymers of vinyl monomers (to the extent they can be formed into self-supporting thin films) such as vinyl toluene, methyl methacrylate, alpha-methyl styrene, diallyl phthalate, triallyl cyanurate, and methyl acrylate, are soluble in resin formulations containing vinylic monomers.

Therefore, in accordance with one aspect of the invention, there is provided an additive package useful in compounding resin formulations which contain one or more vinyl monomers, comprising an envelope formed of a thin, flexible sheet of organic polymeric material which is soluble in the vinyl monomer, the envelope containing one or more additives, and being formed in and supported by a rigid shipping/storage container.

In accordance with another aspect of the present invention, there is provided an additive package consisting of a thin flexible sheet of synthetic organic polymeric material which is soluble in vinyl monomer and which contains one or more additives, one or more of which additives is reactive with the material from which the envelope is made, the reactive additives being coated with an inert substance and/or suspended in an inert vehicle. Accordingly, the material from which the thin envelope is made is protected from attack by the reactive additives contained therein and enjoys a long shelf life.

In accordance with a more limited aspect of the present invention, there is provided a method of manufacturing an additive package from a thin, flexible sheet of organic polymeric material, i.e., a plastic film which comprises placing a piece of film over a mandrel, sliding a rigid container over the film and onto the mandrel so that the film is formed and folded into a lining for the rigid container, i.e., the film substantially conforms to the interior surface of the rigid container. The film is of a size so that it protrudes beyond the end of the rigid container. The additives are placed in the lined container, and the protruding portions thereof are sealed by closing and sealing the protruding ends thereof. The rigid container may then be capped. The mandrel may be, and preferably, is heated to an elevated temperature, i.e., to above room temperature, to aid in forming and folding the film into the desired shape. When the film material is polystyrene, an elevated temperature of between about 180° F to 220° F, preferably about 190° F to 210° F, of the mandrel outer surface is preferred.

The package in accordance with the invention thus comprises an envelope formed of a thin film of plastic material within a rigid, supporting container. Preferably, the film is not more than about two mils in thickness. The most preferred material of the invention is polystyrene film of about one mil in thickness; a preferred range of film thickness is between about one and about 1.5 mils in thickness, although any thickness of film up to and including about 2 mils is suitable. Generally, the thinner the film is, the more quickly it will dissolve in the resin formulation, but the more likely it is to be broken during packaging or storing and handling. A film thickness of about 1 mil has been found to be the most desirable compromise between quick solubility and sufficient mechanical strength. Ordinarily, a film of one mil or even 2 mils thickness would not have sufficient mechanical strength to withstand packaging and handling, but when made and used in accordance with the invention, such films have been found to be of suitable mechanical strength.

In accordance with the invention, the additive envelope is prepared by placing a sheet of film over a mandrel of suitable shape and sliding a rigid container, the inner surface of which is complementary, i.e., substantially conforms to, the outer surface of the mandrel, over the film and onto the mandrel. The interior of the rigid container obviously must be slightly larger than the outside dimension of the mandrel with the formed, folded film around it. The fit of the container over the mandrel is snug enough, however, to form the film into a surface-clinging lining of the container. Accordingly, the film must be of a sufficient size so that upon being formed and folded between the mandrel and the container, it lines and clings to the entire inside surface of the container, and extends for a sufficient distance beyond the open end of the container to provide a flap for sealing.

The invention will be described in detail in connection with a preferred embodiment thereof, which is illustrated in the attached drawings wherein:

FIGS. 1A through 1F show schematically the sequence of assembling an additive package in accordance with the invention;

FIG. 2 shows a partial section view of a package in accordance with the invention; and FIG. 3 shows schematically the use of an additive package in accordance with the invention.

Referring now to FIG. 1-A, there is shown an electrically heated substantially cylindrically shaped mandrel 10 supported on its base 12 and provided with a lead 14 to a power source (not shown), and a control 16 to adjust the surface temperature of the mandrel 10.

Figure 1A:
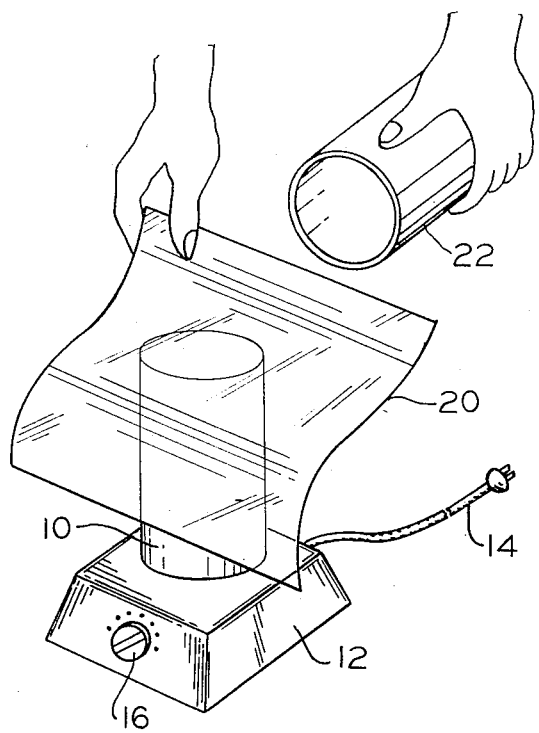
Figure 1C:
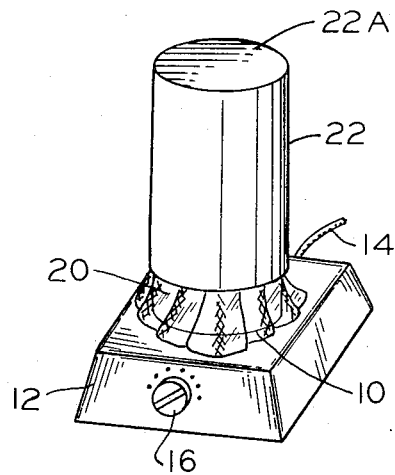
Figure 1B:
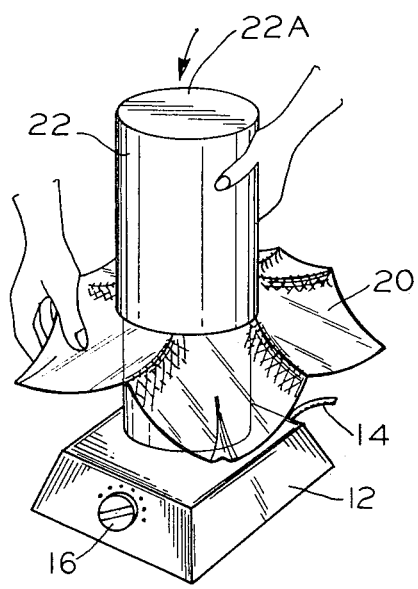
Figure 1D:
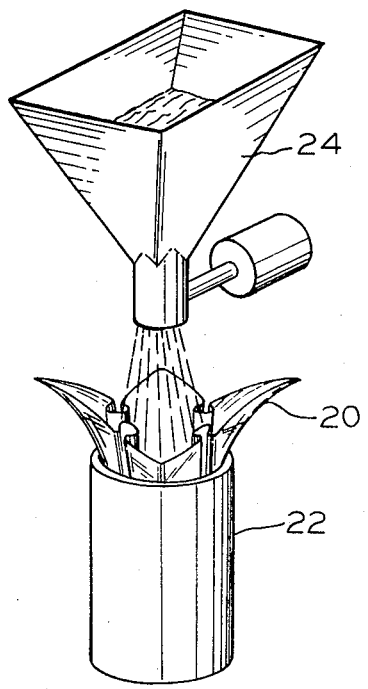

A sheet of thin plastic film 20, preferably one mill thick polystyrene, is held in place substantially centered over the mandrel. A rigid container 22, the inner surface of which substantially conforms to the outer surface of mandrel 10, is slipped onto madrel 10 and over film 20, as shown in FIG. 1B.

As shown in FIG. 1-C, container 22 is pushed all the way down onto mandrel 10 until the closed end 22-A of container 22 meets the upper horizontal surface of mandrel 10. Sheet 20 is seen to be large enough so that a folded portion thereof extends beyond the end of container 22 for a distance sufficient to provide a sealing flap for the finished envelope.

At this point, additive material is placed inside the film envelope as shown in FIG. 1-D, wherein a feed hopper 24 introduces a measured quantity of additive into the envelope. Actually, a number of different additives may be combined in the envelope. After filling, the protruding flaps of film are sealed, as shown in FIG. 1E, by any suitable means, shown schematically as a heat sealer 23. Obviously, any suitable means, such as twisting or folding, heat sealing, employing an adhesive, or a tie cord, etc., may be used to seal the envelope.

Finally, a lid 26 is placed over container 22 (FIG. 1-F) to complete the shipping and storage and container. Shipping labels, identifying, and/or instruction labels, etc., shown as item 25 may of course be applied.

It will be observed that the thin film package is formed by its rigid shipping and storage container, and is at all times from the moment of being formed, protected and supported by the rigid container. Accordingly, the very thin sheet of plastic is able to withstand the filling operation and the handling in shipment and storage without rupturing. Even if a small rupture should occur in the film, a dry material will substantially be held in place within the container by the tight fit between the rigid container and the film. By using a rigid container made of or lined with a liquid-resistant material, even a leak in the envelope of a liquid additive presents no great problem. Normally, a simple cardboard construction of the rigid container will suffice, because rupture of the thin film material is prevented by the support of the rigid container 22. This is shown in FIG. 2, where even if a rupture should appear in the film, significant leakage through the film is precluded by the back-up provided by the inner surface of container 22. At any event, being fully supported at all points by the container, the likelihood of a rupture in the film is remote. If desired, cap 26 may be sealed to container 22 by any suitable means, for storage and shipment.

When the package is to be used, as shown in FIG. 3, lid 26 is removed from container 22, and container 22 is simply up-ended over mixing vat 30, which contains the resin formulation. Envelope 20 with its content of additives slides out of container 22 and falls into the resin formulation. Envelope 20, being made of an extremely thin material, not more than two mils in thickness, readily dissolves in the resin formulation, even if the formulation contains only a minor amount of material which will serve as a solvent for the material of envelope 20. Container 22 and lid 26 may be discarded or reused as desired.

In accordance with another aspect of the present invention, there is provided, in a method of compounding a resin containing a solvent component with at least one additive, the steps of introducing into the resin a measured amount of at least one additive contained in an envelope formed of a thin sheet of synthetic, organic polymeric material which is soluble in the vinyl monomer, and admixing the resin, and the envelope with its contents, until the entire envelope dissolves in the solvent component and the additive is substantially uniformly dispersed throughout the resin. Preferably, the solvent component is one or more vinylic monomers.

It is therefore, an object of the invention to provide an additive package for use in compounding resins.

A further object of the invention is to provide an additive package comprising an envelope formed of a thin sheet synthetic organic polymeric material for use in compounding a resin containing a solvent component, in which the envelope is soluble.

A further object of the invention is to provide an additive package which may be used simultaneously to incorporate a plurality of additives in a resin.

Another object of the invention is to provide an additive package containing one or more additives which are reactive with the material of the package, and yet has a good shelf life.

Another object of the invention is to provide a simple, efficient method of manufacturing the filled envelope package.

Yet another object of the invention is to provide a method of compounding resin formulation, eg, a polyester resin containing a solvent component, eg, vinyl monomers, by mixing with the resin an envelope made of a thin sheet of material, eg, polystyrene film, soluble in the solvent component, and containing at least one additive for the resin.

Additives which may be packaged and used in the compounding of resins according to the present invention, include catalysts, colorants, ultraviolet stabilizers, fillers, fibrous reinforcement materials, thixotropic agents, mold release agents and the like. It is preferable that the additive be non-reactive with the material from which the additive envelope is formed, but this is not essential, because in some instances it is possible to coat a reactive additive with an inert temporary covering to prevent interaction of the additive with the material forming the envelope. The temporary protective material should dissolve or otherwise dissipate when the additive package is admixed with the resin. Further, an additive which is reactive with the envelope material may be dispersed in a non-reactive vehicle such as mineral oil, whereby the reactive particles are coated with the oil and reaction between the envelope and the reactive particles is eliminated or at least substantially alleviated. For example, a peroxide catalyst, such as, benzoyl peroxide or such as cyclohexanol peroxide may be made into a paste with a mineral oil vehicle rather than dissolved in a conventional carrier (eg, dibutyl phthalate or tricresyl phthalate), which would itself attack the envelope material.

The invention also contemplates an additive package which contains a plurality of additives. Where the additives are compatible and non-reactive with each other, they may be admixed directly with each other and placed in an envelope. In some instances the compatibility of additives obtains only when they are in a dry state. In this event care should be exercised to place dry additives in the envelope, evacuate air from the envelope if deemed necessary and then seal the envelope, as by heat-sealing.

Where the additives to be combined in a single envelope interact with each other, as for example many colorants will react with peroxide catalysts, it is contemplated that they be physically separated, yet within the same envelope. This can be accomplished by utilizing one envelope within another or by coating one or both of the materials with an inert, temporary protective covering. It will be appreciated that a plurality of separate envelopes may also be employed to hold different additives which would be troublesome to hold in a single envelope.

The material from which the additive package envelope is formed should be readily soluble in the in the solvent component present in the resin system. When the solvent component is one or more vinyl monomers, then, as aforesaid, to the extent that these monomers polymerize, e.g., methyl acrylate and methyl methacrylate, to form self-supporting films or sheets which can then be dissolved in the monomers, their polymerizates in thin sheet or film form may also serve as the material forming the additive package envelope.

Present economics strongly favor polystyrene film as the synthetic organic polymeric material for forming the additive package envelope. According to the preferred embodiment of the invention the polystyrene takes the form of an oriented film, having a thickenss up to about 2 mils and preferably between about 1 and 1.5 mils.

Non-oriented film may also be used but to no particular advantage, and it is generally less readily available and more expensive than oriented film.

Where one or more of the additives to be packaged in accordance with the present invention are solids which would tend to dissolve or react with the film package, a vehicle may be used which will coat the reactive particles so that these will not attack or dissolve the envelope. Thus, while tricresyl phosphate and phthalic esters such as butyl and dioctyl phthalate are used conventionally as vehicles for solid peroxide catalysts, they cannot be used in the practice of the present invention with a polystyrene or other vinylic film, since they would almost immediately dissolve the material from which the envelope is formed.

Consequently other, inert, vehicles must be selected, and as a group, essentially aromatic-free oils are satisfactory for the purpose. These may be of animal, vegetable or mineral origin and either a lubricating, plasticizing or drying type. Specific examples include USP mineral oil, castor oil, linseed oil, coconut oil and the like. Because of its complete freedom from aromatic and other deleterious compounds mineral oils are preferred as the inert vehicle.

The substitution of a mineral oil as a vehicle to carry the peroxide catalyst does not adversely affect the properties of the finished product, and the coating action of the mineral oil on the particle permits the additive to be prepackaged in a thin film, e.g., polystyrene, package in accordance with the invention. The suitability of the mineral oil vehicle is illustrated in the examples set forth below, as is the lack of adverse affect by introduction of the (dissolved) polystyrene film.

EXAMPLE 1

The following ingredients were admixed in the proportions indicated:

| INGREDIENT | Wt % |
|---|---|
| Unsaturated polyester resin* | 35.0 |
| Benzoyl peroxide paste (50% di octyl phthalate vehicle) | 0.6 |
| Black iron oxide | 1.0 |
| Zinc stearate | 1.2 |

| | |
|---|---|
| Asbestos floats | 27.2 |
| Calcium carbonate | 12.0 |
| ¼" glass fibers | 13.0 |
| ¼" sisal fibers | 10.0 |

*a commercially available premix resin, (1002-10 manufactured by Commercial Resin Division of Interplastic Corporation) based on maleic anhydride and dipropylene glycol, containing 25 wt % vinyl toluene.

The glass fibers were added last to minimize breakage.

A portion of the resin composition was placed in a mold cavity and a slab measuring approximately 0.1 inch in thickness was molded and cured at conventional pressure and temperature values.

EXAMPLE II

The procedure described in Example 1 was repeated with the following changes:

USP mineral oil was substituted as the vehicle for the benzoyl peroxide and this ingredient together with the black iron oxide were placed in an envelope consisting of 5 mil thick oriented polystyrene film. The envelope together with its contents were admixed with the resin until the film dissolved in the vinyl toluene and the catalyst paste and pigment were substantially uniformly dispersed throughout the resin.

A visual inspection of the specimens produced in accordance with Examples 1 and II revealed no discernible differences.

The specimens were tested for flexural strength in accordance with ASTM D-790; for impact strength in accordance with ASTM D-256; and for fluxural modulus in accordance with ASTM D-790. The results are recorded in Table I below:

TABLE I

| Physical Property | Example I | Example II |
|---|---|---|
| Flexural strength, avg. (psi) | 10,806 | 11,734 |
| Impact strength (foot-lbs/inch of notch-Izod) | 2.87 | 3.13 |
| Flexural modulus (psi) | 668,080 | 701,280 |

The foregoing data indicates that the dissolution of the polystyrene bag in the resin and the use of mineral oil as the vehicle for the catalyst did not have an adverse affect on the physical properties of the molded specimen.

EXAMPLE III

The following ingredients were admixed in the proportions indicated.

| INGREDIENT | Wt % |
|---|---|
| Unsaturated polyester resin* | 66 |
| Benzoyl peroxide paste (50% di-octyl phthalate vehicle) | 1.5 |
| Clay (ASP 400) | 30 |
| Green pigment dispersion | 2.5 |

*a commercially available resin based on isophthalic acid and diethylene glycol, believed to contain about 25 wt % styrene.

A portion of the resin composition was placed in a mold cavity and molded and cured at conventional pressure and temperature valees.

EXAMPLE IV

The procedure described in Example III was repeated with the following changes.

USP Mineral oil was substituted as the vehicle for the benzoyl peroxide and the resulting paste was placed in an envelope consisting of a 5 mil thick polystyrene film. The envelope together with its contents were admixed with the resin until the film dissolved in the styrene and the catalyst paste was uniformly dispersed throughout the resin.

A visual inspection of the specimens produced in accordance with Examples III and IV revealed no discernible differences.

The specimens were tested for hardness (Barcol) and no significant difference in values was found.

The present invention may be practiced advantageously with the incorporation of viscosity control agents or thickeners into resin systems. These agents find utility in resin formulations designed for sheet molding, bulk molding and low profile applications. Conventional viscosity control agents include CaO, Ca(OH)$_2$, MgO and Mg(OH)$_2$.

As a foresaid, because of the hygroscopicity of these agents they are somewhat difficult to weigh accurately since the proportion of gross weight attributable to water pickup will vary with the length of time the material has been exposed to the atmosphere and the humidity in the atmosphere.

Further, since the pick-up of water tends to cause the materials to cake, it becomes difficult to uniformly distribute them throughout the resin. This problem is eliminated, in accordance with the present invention, by accurately weighing the viscosity control agents when dry and maintaining them in a dry state by sealing them in the additive package envelope which serves as a very satisfactory vapor barrier.

Although the dissolution of the envelope in the compounded resin does introduce a "contaminant," the quantity of polymeric material dissolved is so small that it has no discernible affect on the appearance of physical properties of the cured resin.

The invention is operative with any resin system containing a sufficient amount of solvent component to solubilize the additive package envelope within a reasonable period. The polyesters, i.e., those resins formed by the reaction between a dibasic acid and a dihydroxy alcohols, which contain a vinyl monomer as a crosslinker, are particularly suitable.

The present invention contributes to the art an additive package useful in compounding polyester resins and a method of compounding such resins. The invention has been described in connection with certain specific embodiments. It will be appreciated however, that modifications of the disclosed invention will readily suggest themselves to those skilled in the art upon reading this disclosure. For example, multiple envelopes formed within their own rigid containers may be packed into a larger container to prepare a set of additive packages. Also, the envelope and rigid container (and necessarily, the mandrel) may have other than a cylindrical shape, e.g., the shape may be rectangular, ovoid or square in cross section. It is intended to include all such modifications within the scope of the appended claims.

As employed in the appended claims the term "non-reactive," when used to describe an additive which is inert with respect to the envelope, is intended to embrace also reactive additives which have been treated as by being coated or dispersed in a non-reactive vehicle to render them non-reactive relative to the envelope material.

What is claimed is:

1. A package for introducing additives to resin formulations containing at least one solvent component, comprising a rigid container having a surface — clinging lining formed on the inside thereof, said lining comprising a removable envelope formed of a film of synthetic organic polymeric material not greater than about two mils thick, and soluble in said solvent component, and at least one additive contained within said envelope, which additive is reactive with said organic polymeric material and is coated with an inert substance.

2. The package of claim 1 wherein said solvent component is a vinyl monomer and wherein said film is selected from the class consisting of polymers and copolymers of one or more of the following: styrene, methyl styrene, binyl toluene, methyl methacrylate, diallyl phthalate, triallyl cyanurate, and methyl acrylate.

3. The package of claim 1 wherein said solvent component is a vinyl monomer.

4. A package for introducing additives to polyester resin formulations containing at least one solvent component, comprising a rigid container having a surface — clinging lining formed on the inside thereof, said lining comprising a removable envelope formed of a film of synthetic organic polymeric material not greater than about two mils thick, and soluble in said solvent component, and at least one additive contained within said envelope, which additive includes a solid catalyst for said polyester resin, said catalyst being dispersed in an inert liquid vehicle.

5. The package of claim 4 wherein said additive further includes a colorant for said polyester resin.

6. The package of claim 4 wherein said catalyst is benzoyl peroxide and said liquid vehicle is s substantially aromatic-free mineral oil.

7. The package of claim 1 wherein said additive includes a colorant for said resin.

8. A package for introducing additives to resin formulations containing at least one solvent component, comprising a rigid container having a surface — clinging lining formed on the inside thereof, said lining comprising a removable envelope formed of a film of synthetic organic polymeric material not greater than about two mils thick, and soluble in said solvent component, and at least one additive contained within said envelope, which additive is reactive with said organic polymeric material, and is suspended in an inert liquid vehicle.

9. The package of claim 8 wherein said inert vehicle is mineral oil.

10. The package of claim 8 wherein said solvent component is one or more vinyl monomers.

11. The package of claim 8 wherein said solvent component is a vinyl monomer.

12. The package of claim 8 wherein said solvent component is a vinyl monomer and wherein said film is selected from the class consisting of polymers and copolymers of one or more of the following: styrene, methyl styrene, vinyl toluene, methyl methacrylate, diallyl phthalate, triallyl cyanurate, and methyl acrylate.

* * * * *